United States Patent

So

(10) Patent No.: US 8,989,020 B2
(45) Date of Patent: Mar. 24, 2015

(54) BIDIRECTIONAL FORWARDING DETECTION (BFD) PROTOCOL EXTENSION FOR DETECTING RANDOM TRAFFIC DROPPING

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 621 days.

(21) Appl. No.: 12/630,086

(22) Filed: Dec. 3, 2009

(65) Prior Publication Data

US 2011/0134791 A1    Jun. 9, 2011

(51) Int. Cl.
*H04L 12/26* (2006.01)
*H04L 12/24* (2006.01)

(52) U.S. Cl.
CPC ........ *H04L 43/0835* (2013.01); *H04L 41/5009* (2013.01)
USPC ........................................................ 370/241

(58) Field of Classification Search
CPC .......... H04L 43/10; H04L 45/22; H04L 45/28
USPC ........... 370/241–248, 252, 253; 709/223–229
See application file for complete search history.

(56) References Cited

U.S. PATENT DOCUMENTS

| | | | |
|---|---|---|---|
| 7,561,527 B1 * | 7/2009 | Katz et al. | 370/241 |
| 7,668,107 B2 * | 2/2010 | Arad et al. | 370/242 |
| 7,742,400 B2 * | 6/2010 | Liu | 370/218 |
| 7,773,611 B2 * | 8/2010 | Booth et al. | 370/401 |
| 8,073,945 B2 * | 12/2011 | Sommers et al. | 709/224 |
| 8,111,611 B2 * | 2/2012 | Kapoor et al. | 370/216 |
| 2008/0186866 A1 * | 8/2008 | Morinaga et al. | 370/247 |
| 2010/0008249 A1 * | 1/2010 | Fukuyama et al. | 370/252 |

* cited by examiner

Primary Examiner — Dmitry H Levitan

(57) ABSTRACT

A network device receives, via a forwarding path, a sequence of packets, where each of the packets includes a sequence number. The network device extracts the sequence numbers from the sequence of packets, records the extracted sequence numbers, and determines a first number of packets of the sequence of packets that have been dropped on the forwarding path based on the extracted sequence numbers. The network device determines a traffic dropping ratio for the forwarding path based on the first number of the packets of the sequence of packets that have been dropped on the forwarding path.

20 Claims, 9 Drawing Sheets

BIDIRECTIONAL FORWARDING DETECTION (BFD) PROTOCOL EXTENSION FOR DETECTING RANDOM TRAFFIC DROPPING

BACKGROUND

Random traffic dropping is a large problem in today's communication networks. As a result of random traffic dropping, traffic may just disappear during the transmission without any alarms being triggered. For example, a physical link between two routers may experience a random traffic drop of 0.3 percent, meaning that, on average, three packets out of every 1,000 packets sent simply disappear. Since many of today's applications (e.g., electronic trading applications) demand ultra high service delivery ratios (e.g., in the range of 99.99% to 99.999%), random dropping can cause problems for these ultra high service delivery ratio communication applications. Since the nature of this problem is random, and because the global network is very large and complicated, it can be extremely difficult to detect and trouble-shoot the occurrence of random traffic dropping.

Random traffic dropping can occur due to many causes. The most common causes are transport medium degradation with respect to time, such as fiber optics and electronic equipment degradation. Severe operating conditions, such as high or low temperature and humidity and/or unstable electrical input, can also cause random traffic dropping. Random traffic dropping may also disappear and reappear randomly, making trouble shooting that much more difficult.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Bidirectional Forwarding Detection (BFD) is a network protocol that may be used to detect faults between two network nodes (e.g., between two forwarding engines of the nodes) connected by a link. BFD enables low-overhead detection of faults, including on links that normally do not support failure detection, such as, for example, Ethernet, Virtual Circuits (VCs), tunnels and/or Multiprotocol Label Switching (MPLS) Label Switched Paths (LSPs). BFD may establish a session between two endpoints on a particular forwarding path, and then BFD packets may be sent between the endpoints at pre-determined intervals. If the BFD packets are not received by the destination endpoint for a pre-determined period of time, the destination endpoint may declare a failure associated with the forwarding path.

Exemplary embodiments described herein implement the BFD network protocol with the inclusion of a BFD sequence number in each BFD packet to detect faults, including random traffic dropping, on a forwarding path between two network nodes. When BFD packet sequence numbering is enabled as described herein, a source node may insert a sequence number into each BFD packet that is sent between a source node and a destination node in a BFD session. The destination node, upon receipt of each BFD packet, may record the sequence number. After a period of time, the destination node can determine how many BFD packets have been dropped and a traffic dropping ratio can thereby be determined. The traffic dropping ratio can be compared with a traffic drop policy to determine if a forwarding path failure has occurred. The traffic dropping ratio can also be used for general network reporting purposes, or to trigger alarms. BFD packets, with BFD sequence numbers, may be particularly useful in detecting random traffic dropping. BFD packets, with BFD sequence numbers, may, for example, be implemented globally in a network for network routing (and re-routing) decision making, for Service Level Agreement (SLA) enforcement and verification, and for network maintenance and troubleshooting. BFD packets, with BFD sequence numbers, may also be implemented on a hop-by-hop basis for operational troubleshooting purposes.

Figure 1:
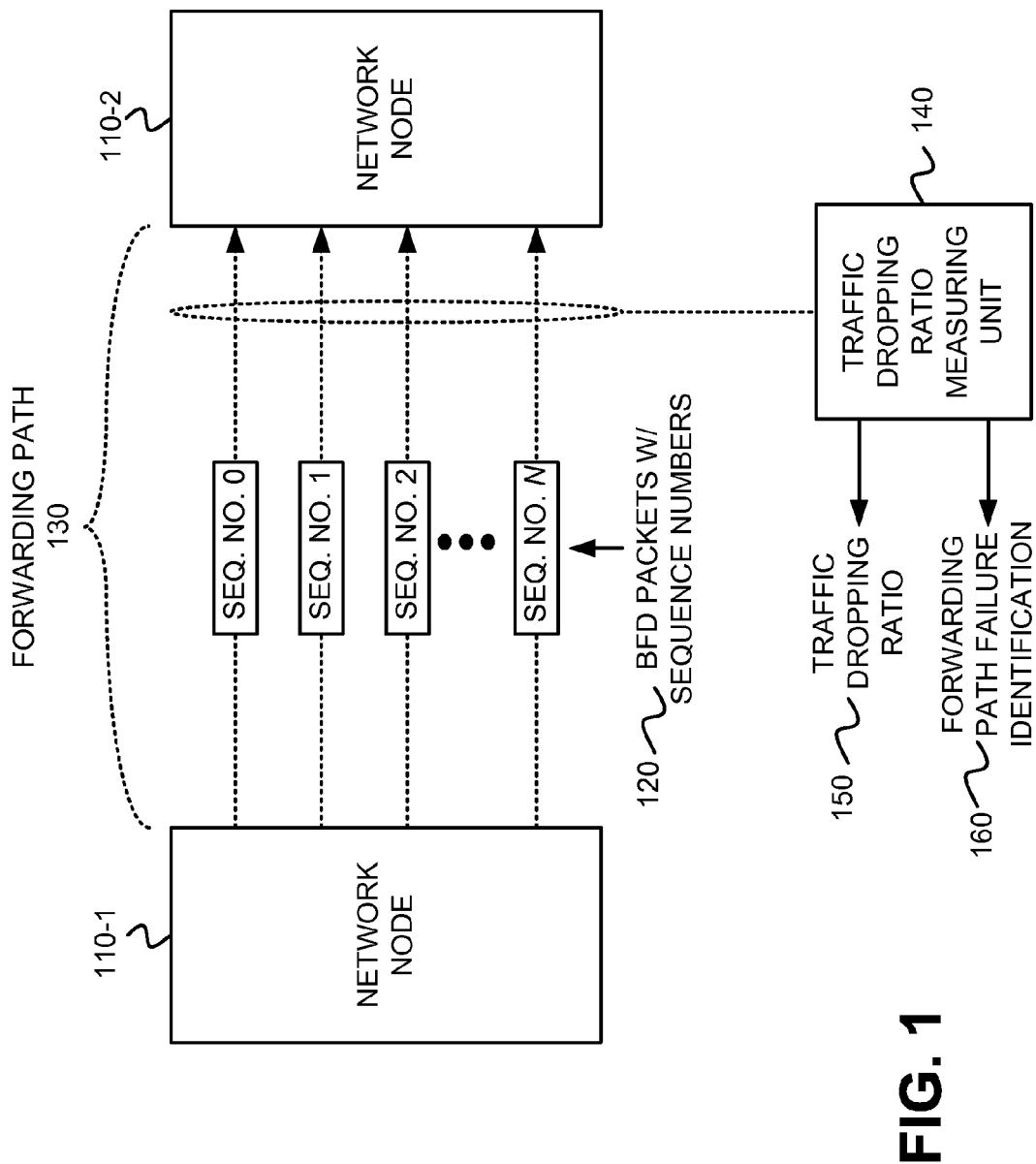
FIG. 1 is a diagram of an overview of the detection of traffic dropping on a forwarding path using sequences of packets according to an exemplary embodiment.

FIG. 1 is a diagram of an overview of the detection of traffic dropping on a forwarding path between two nodes in a network using sequence numbers contained in BFD packets sent between the two nodes. As shown in FIG. 1, a network node 110-1 may send a sequence of BFD packets 120 on a forwarding path 130 to another network node 110-2 during an established BFD session. Each packet of the sequence of BFD packets 120 may include a BFD sequence number. The BFD sequence number may identify a sequential number of the respective BFD packet in the sequence of BFD packets of a specific BFD session.

Forwarding path 130 may include a physical link, such as, for example, an optical fiber link or an optical wavelength on an optic fiber link, or may include a logical link such as a Multi-Protocol Label Switching (MPLS) Label Switched Path (LSP) or a virtual circuit (e.g., a permanent virtual circuit (PVC)). Each of network nodes 110-1 and 110-2 (generically referred to herein as a "network node 110") may include any type of network device, such as, for example, a router, a switch, a bridge, a hub, a repeater, or a gateway. Forwarding path 130 may exist in a network (not shown) that may include one or more networks of any type, such as, for example, a local area network (LAN), a wide area network (WAN), a metropolitan area network (MAN), an intranet, the Internet, a wireless satellite network, a cable network (e.g., an optical cable network), and/or a wireless public land mobile network (PLMN).

A traffic dropping ratio measuring unit 140 may, based on the sequence numbers contained in the BFD packets 120, determine how many packets have been dropped in a given period of time. The number of determined dropped packets may be used to determine a traffic dropping ratio 150 (i.e., a ratio of a number of dropped packets to a total number of packets that had been sent in the sequence). Traffic dropping ratio measuring unit 140 may also identify any forwarding path failures 160 based on the traffic dropping ratio 150. Traffic dropping ratio measuring unit 140 may be implemented as an integral component of a network node (e.g., in destination network node 110-2), or may be implemented in a stand-alone device that monitors traffic between network nodes 110-1 and 110-2 on forwarding path 130.

Figure 2:
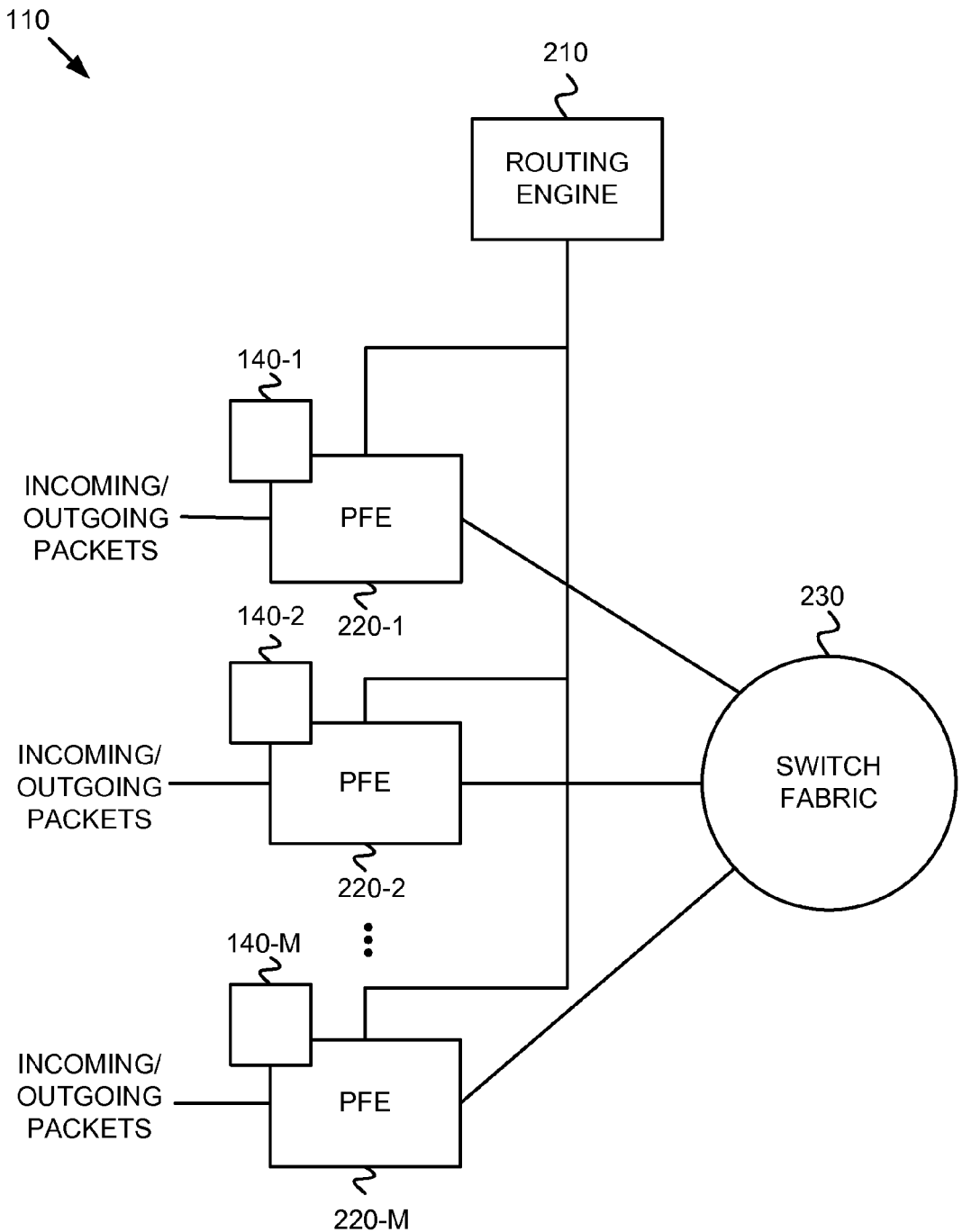
FIG. 2 is a diagram depicting exemplary components of a network node of FIG. 1 or 2.

FIG. 2 is a diagram of exemplary components of network node 110. Network node 110 may receive one or more packet streams from one or more links, process the stream(s) to determine destination information, and transmit the stream(s) on one or more links in accordance with the destination information.

Network node 110 may include a routing engine 210, and multiple packet forwarding engines (PFEs) 220-1 through 220-M interconnected via a switch fabric 230. Switch fabric 230 may include one or more switching planes to facilitate communication between two or more of PFEs 220. In one exemplary implementation, each of the switching planes may include a multi-stage switch of crossbar elements. Other types of switching planes may, however, be used.

Routing engine 210 may perform high-level management functions for network node 110. For example, routing engine 210 may communicate with other networks and systems connected to network node 110 to exchange information regarding network topology. Routing engine 210 may create routing tables based on network topology information, may create forwarding tables based on the routing tables, and may send the forwarding tables to PFEs 220. PFEs 220 may use the forwarding tables to perform route lookups for incoming packets. Routing engine 210 also may perform other general control and monitoring functions for network node 110.

Each PFE 220-1 through 220-M may connect to routing engine 210 and switch fabric 230. Each PFE 220-1 through 220-M may receive packets on links connected to another device or a network, such as a wide area network (WAN), local area network (LAN), or a wireless network. Each link could be one of many types of transport media, such as optical fiber or Ethernet cable. The packets may be formatted according to one of several protocols, such as the synchronous optical network (SONET) standard, Ethernet, or MPLS.

Each of PFEs 220-1 through 220-M may include a respective traffic dropping ratio measuring unit 140-1 through 140-M that may measure a traffic dropping ratio on a forwarding path (e.g., a link) connecting network node 110 with another network node.

Network node 110 may include additional, fewer, different, and/or differently arranged components than those depicted in FIG. 2. Additionally, functions described as being performed by one component of network node 110 may be performed by another, different component of network node 110.

Figure 3:
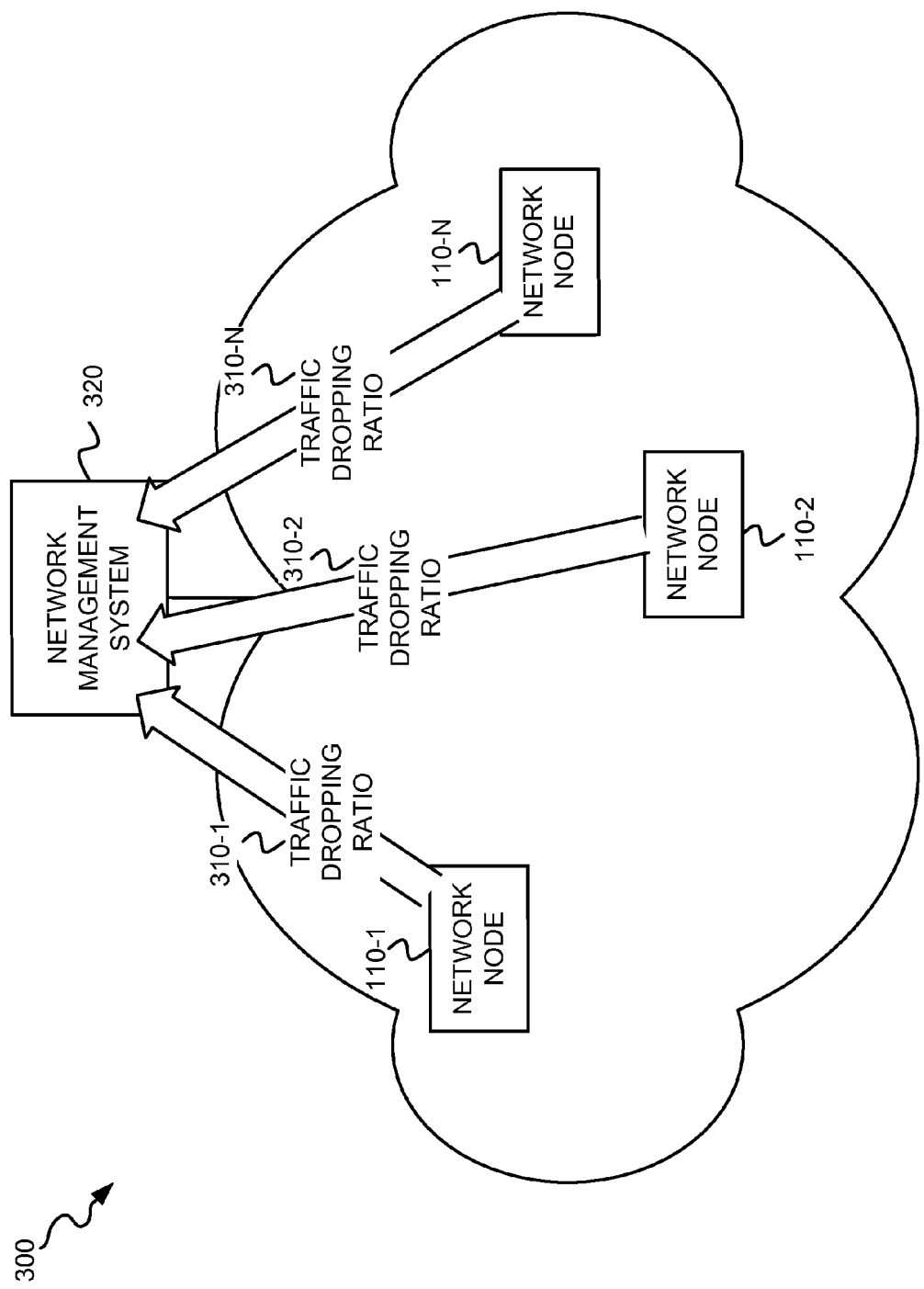
FIG. 3 is a diagram that depicts an exemplary embodiment where traffic dropping ratio measurements, performed at network nodes in a network, are reported to a central network management system.

FIG. 3 is a diagram that depicts an exemplary embodiment in which traffic dropping ratio measurements, performed at network nodes in a network 300, are reported to a central network management system (e.g., associated with a network administrator). As depicted in FIG. 3, multiple network nodes 110-1 through 110-N (where N may be any integer), each having one or more traffic dropping ratio measuring units 140, may report traffic dropping ratio measurements 310-1 through 310-N, associated with respective network nodes 110-1 through 110-N, to a network management system 320. Network management system 320 may store the reported measurements in a database (not shown) for retrieval and use in the managing of network 300 (e.g., for forwarding path failure analyses, SLA enforcement and verification, traffic routing/re-routing decision making, etc.).

Network 300 may include one or more networks, such as, for example, a local area network (LAN), a wide area network (WAN), a metropolitan area network (MAN), an intranet, the Internet, a wireless satellite network, a cable network (e.g., an optical cable network), and/or a wireless public land mobile network (PLMN). Network 300 may include additional, fewer and/or different network components than those depicted in FIG. 3.

Figure 4:
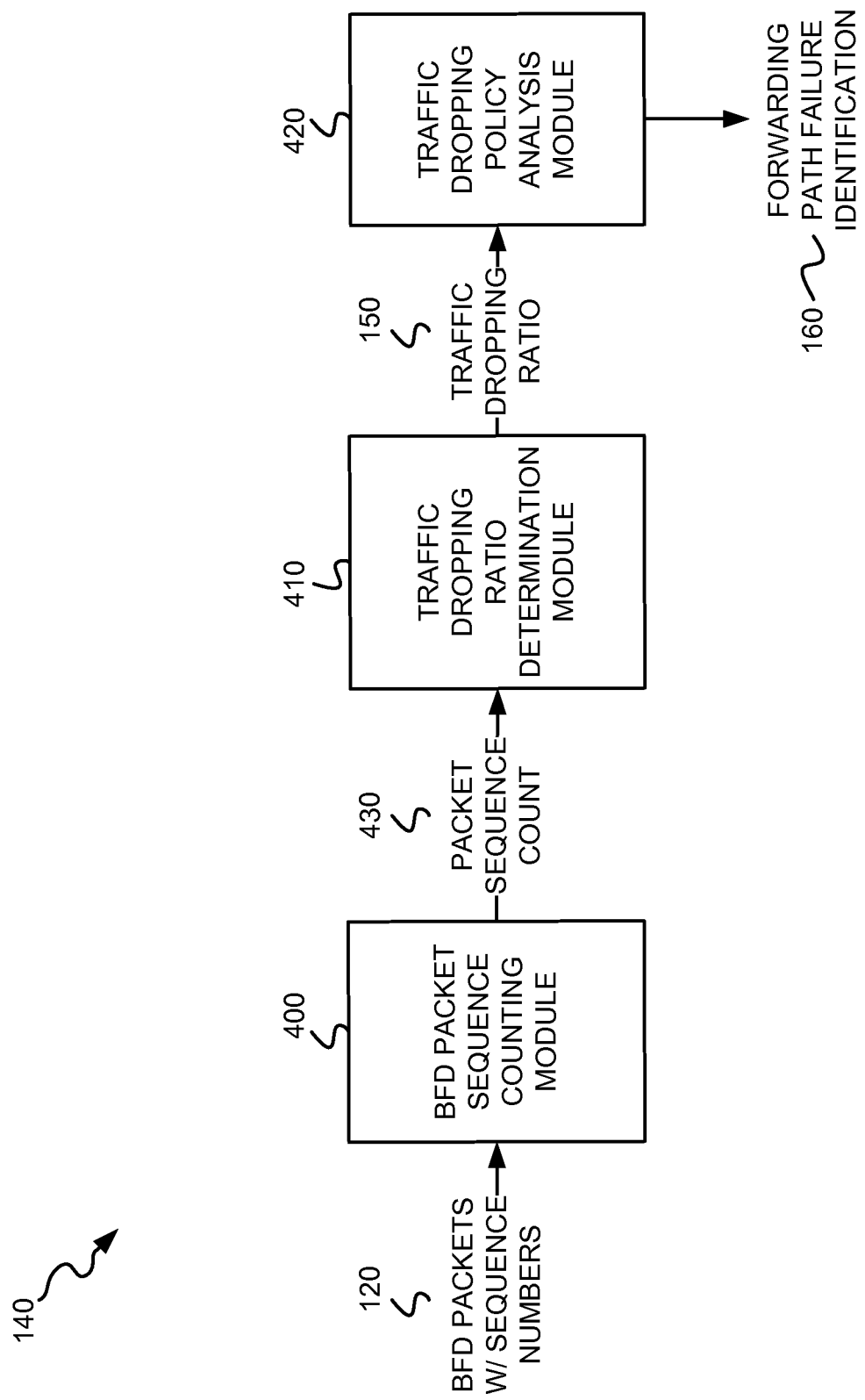
FIG. 4 is a diagram of functional components associated with a traffic dropping ratio measuring unit of FIG. 1 or 2.

FIG. 4 is a diagram of functional components associated with traffic dropping ratio measuring unit 140 of FIG. 1 or 2. Unit 140 may include a BFD packet sequence counting module 400, a traffic dropping ratio determination module 410, and a traffic dropping policy analysis module 420.

BFD packet sequence counting module 400 may receive BFD packets 120 with sequence numbers and may extract the packet sequence numbers to identify which sequence numbers are missing from the received BFD packets. BFD packet sequence counting module 400 may count how many packets have been dropped on the forwarding path, in a given interval of time, based on the identified missing sequence numbers to generate a packet sequence count 430. BFD packet sequence counting module 400 may pass packet sequence count 430 to traffic dropping ratio determination module 410. The recurring interval of time over which module 400 may count a number of packets that have been dropped on the forwarding path may be implemented by a timer (not shown). Packet sequence count 430 may include a count of a number of packets that have been dropped on the forwarding path during the time interval, and a count of a total number of packets in the sequence of BFD packets 120.

Traffic dropping ratio determination module 410, based on packet sequence count 430 received from module 400, may determine a traffic dropping ratio 150 for the forwarding path. Module 410 may determine the traffic dropping ratio by dividing the number of packets that have been dropped on the forwarding path during the time interval by the total number of packets in the sequence of BFD packets 130. Module 410 may pass traffic dropping ratio 150 to traffic dropping policy analysis module 420.

Traffic dropping policy analysis module 420 may receive traffic dropping ratio 150 from module 410, and may compare ratio 150 with a traffic drop policy to identify if a failure on the forwarding path has occurred. The traffic drop policy may include any type or number of traffic policies. In a simple implementation, the traffic drop policy may merely include a maximum traffic drop ratio beyond which the forwarding path is considered to have failed. If the comparison of ratio 150 with the traffic drop policy indicates a failure, then module 420 may issue a forwarding path failure identification 160. In the exemplary embodiment of FIG. 3, module 420 may provide traffic dropping ratio 150 and forwarding path failure identification 160 to network management system 320.

The functional components of traffic dropping ratio measuring unit 140, described above, may be implemented in hardware, or in a combination of hardware and software. If implemented in software, at least some of the various functions of the functional components of unit 140 may be stored as software instructions in a computer-readable medium, and then executed by a processing unit, such as, for example, a central processing unit (CPU). The computer-readable medium may be defined as a physical or logical memory device. A logical memory device may include memory space within a single physical memory device or spread across multiple physical memories.

Unit 140 may include additional, fewer, different, and/or differently arranged components than those depicted in FIG. 4. Additionally, functions described as being performed by one component of unit 140 may be performed by another, different component of unit 140.

Figure 5:
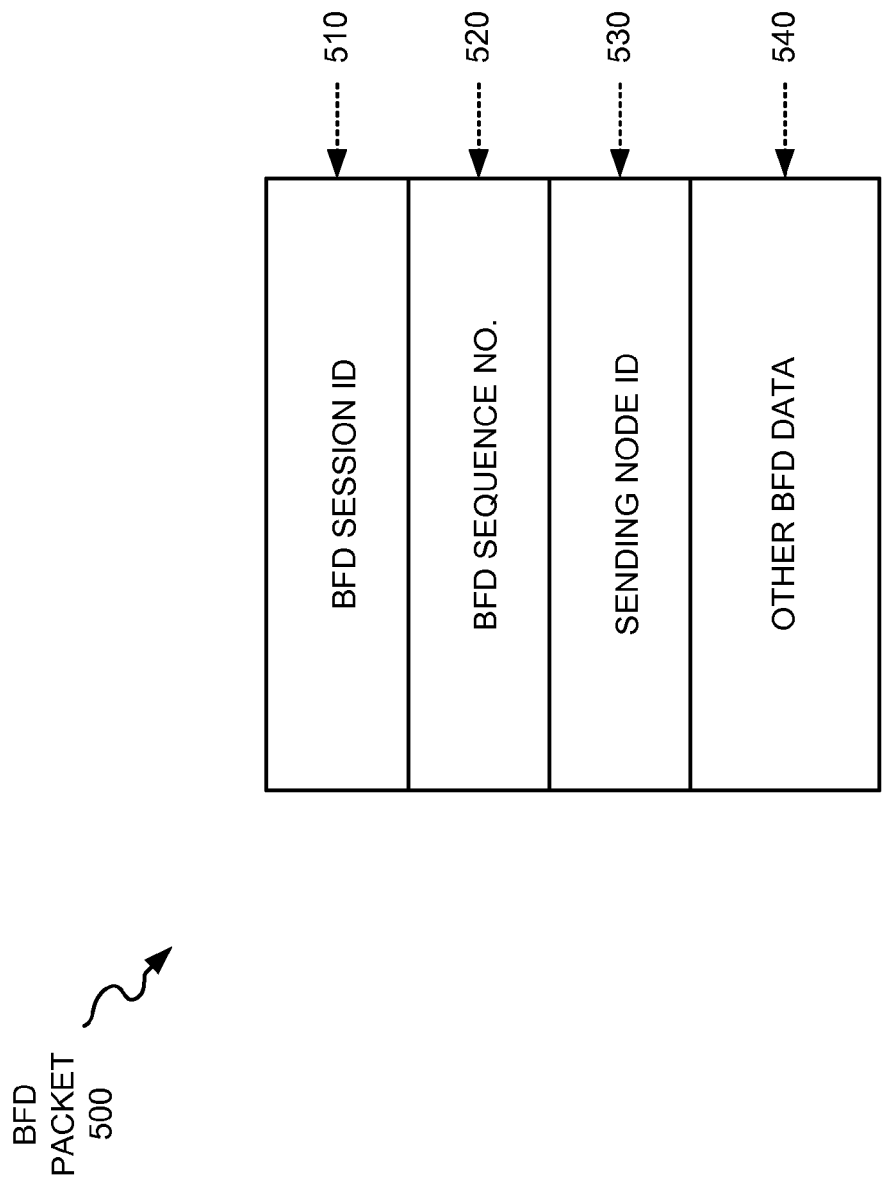
FIG. 5 is an exemplary diagram of a Bidirectional Forwarding Detection packet according to exemplary embodiments.

FIG. 5 depicts an exemplary BFD packet 500 that may be sent between two network nodes (e.g., network nodes 110-1 and 110-2) during a BFD session. BFD packet 500 may include a number of fields including, for example, a BFD session identifier (ID) field 510, a BFD sequence number field 520, a sending node ID field 530 and other BFD data field 540.

BFD session ID field 510 may include information that uniquely identifies a BFD session established between two network nodes (e.g., nodes 110-1 and 110-2). BFD sequence number field 520 may include information that identifies a sequence number of BFD packet 500 in a sequence of packets sent between two network nodes during the session identified in BFD session ID field 510. For example, a first packet in a BFD session may have a sequence number 520 of 0, the second packet in the BFD session may have the sequence number 520 of 1, the third packet in the BFD session may have the sequence number 520 of two, etc. Sending node ID field 530 may include information that uniquely identifies the network node that was the source of BFD packet 500. Other BFD data field 540 may include any other data associated with the BFD session identified by session ID 510.

BFD packet 500 may include additional, fewer, different, and/or differently arranged fields than those depicted in FIG. 5.

Figure 6:
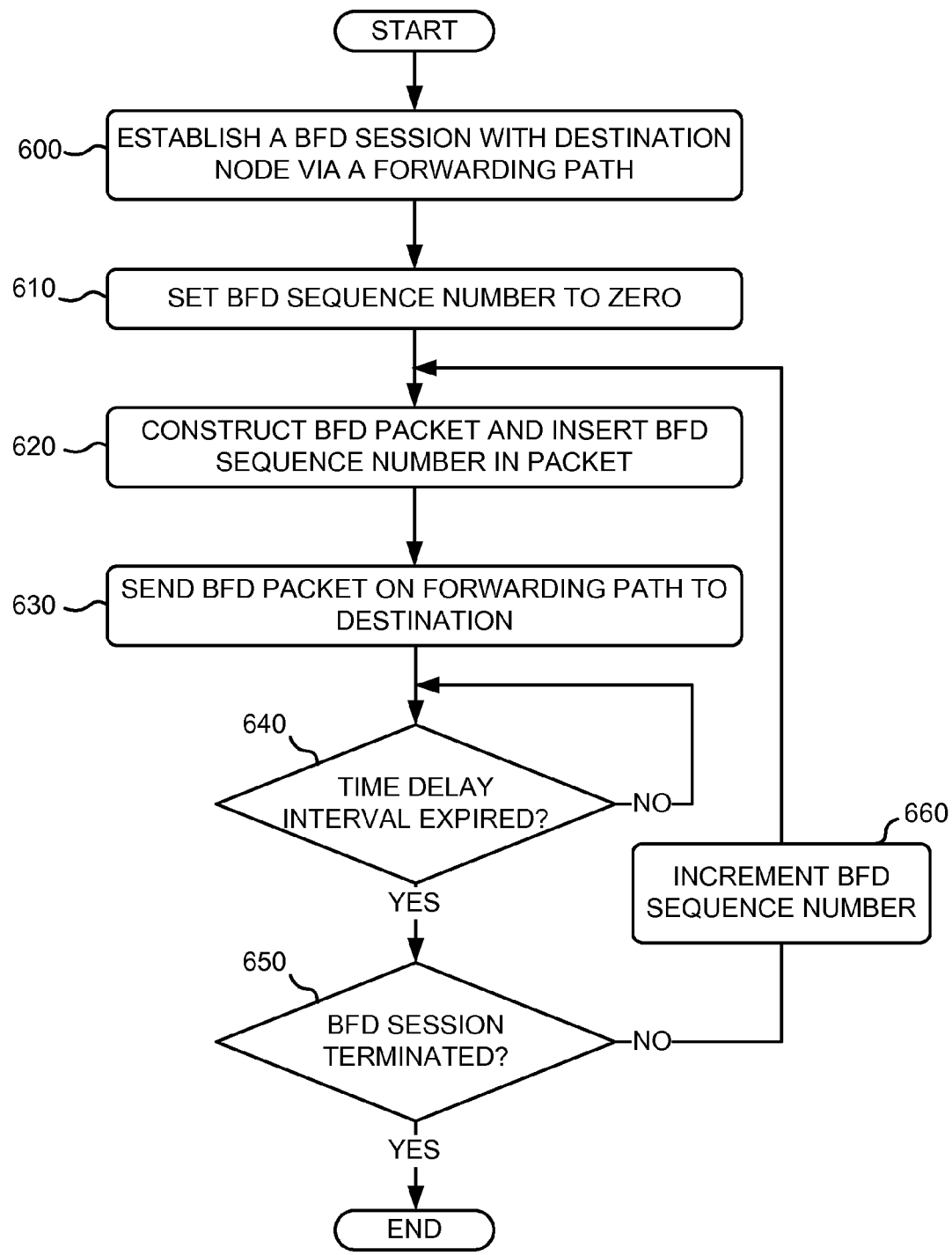
FIG. 6 is a flow diagram illustrating an exemplary process for constructing and sending Bidirectional Forwarding Detection packets, that include sequence numbers associated with a Bidirectional Forwarding Detection session, from a source network node to a destination network node.

FIG. 6 is a flow diagram illustrating an exemplary process for constructing and sending BFD packets, which include BFD sequence numbers, from a source network node to a destination network node. The exemplary process may be performed by a network node 110 (e.g., network node 110-1 in FIG. 1). The exemplary process of FIG. 6 may be described below with reference to the specific example depicted in FIG. 8.

Figure 8:
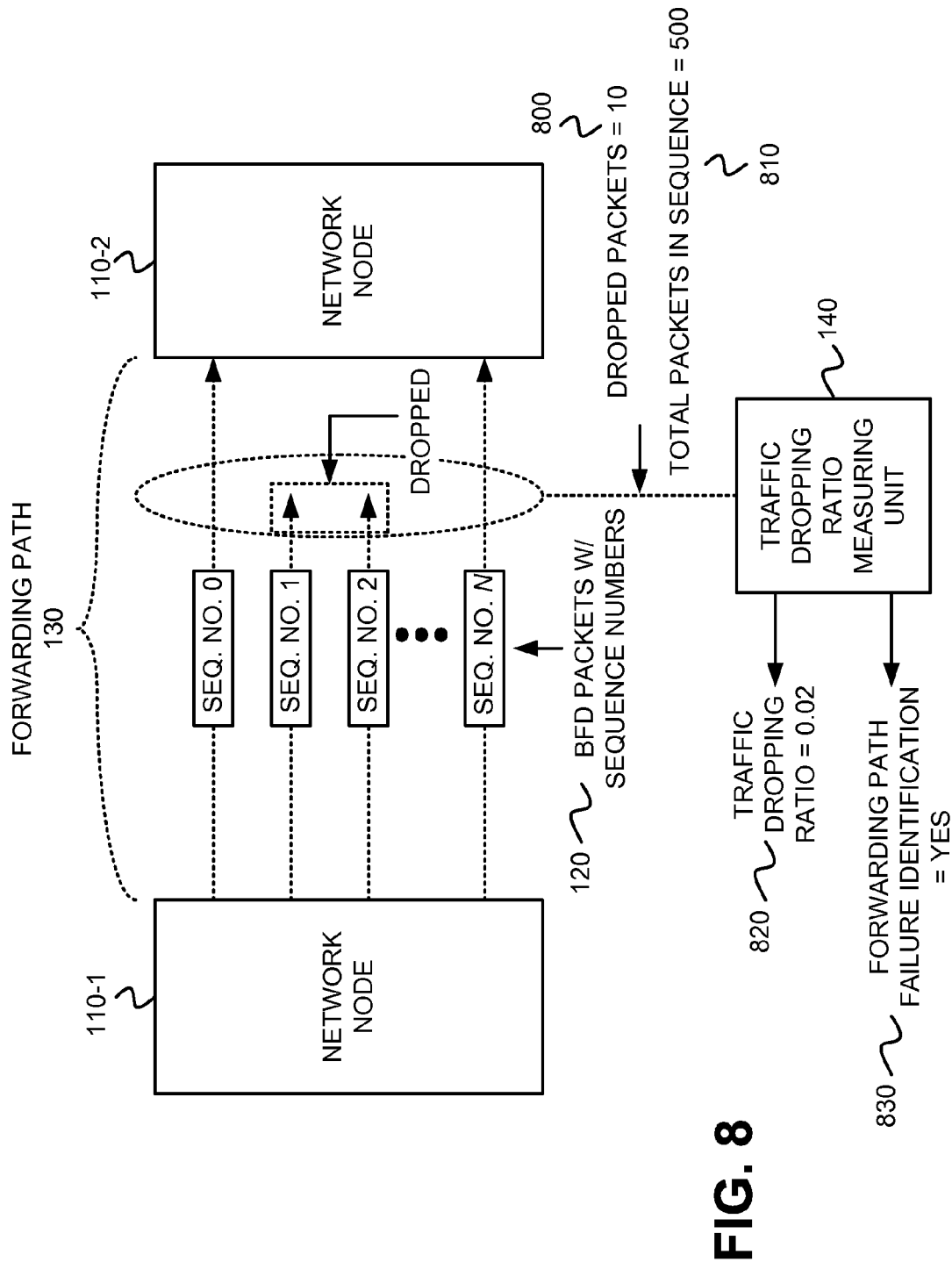
FIG. 8 is a diagram that depicts an example of the exemplary processes of FIG. 6 and FIGS. 7A-7B.

The exemplary process may include establishing a BFD session with a destination node via a forwarding path (block 600). Referring to FIG. 8, network node 110-1 may establish a BFD session with network node 110-2 using, for example, a three-way handshake (not shown). The BFD sequence number may be set initially to zero, or to another initial value (block 610). For example, at the beginning of the BFD session, network node 110-1 may set the sequence number for the BFD session to zero.

A BFD packet may be constructed and the BFD sequence number may be inserted into the BFD packet (block 620). Network node 110-1 may construct BFD packet 500, and may insert the current BFD sequence number into field 520 of packet 500. Network node 110-1 may also insert appropriate values into BFD session ID field 510, sending node ID field 530, and/or other BFD data field(s) 540.

The BFD packet may be sent on the forwarding path to the destination network node (block 630). As depicted in FIG. 8, network node 110-1 may send the BFD packet on forwarding path 130 to network node 110-2. It may be determined if a time delay interval has expired (block 640). A pre-set time delay interval may be set that determines the interval between the sending of each BFD packet from the source network node (e.g., network node 110-1 in FIG. 8). Once the BFD session is established, a BFD packet for the session may be sent after each time delay interval expiration. If the time delay interval has not expired (block 640—NO), the exemplary process may loop at block 640 until the time delay interval does expire. If the time delay interval has expired (block 640—YES), then the exemplary process may continue at block 650.

It may be determined if the BFD session has been terminated (block 650). Either of the network nodes involved in the BFD session (e.g., network nodes 110-1 and 110-2 in FIG. 8) may terminate the BFD session. If the BFD session has not been terminated (block 650—NO), then the BFD sequence number for the session may be incremented (block 660), and the exemplary process may return to block 620 with the construction of a next BFD packet in a sequence of BFD packets. If the BFD session has been terminated (block 650—YES), then the exemplary process may end.

Figure 7A:
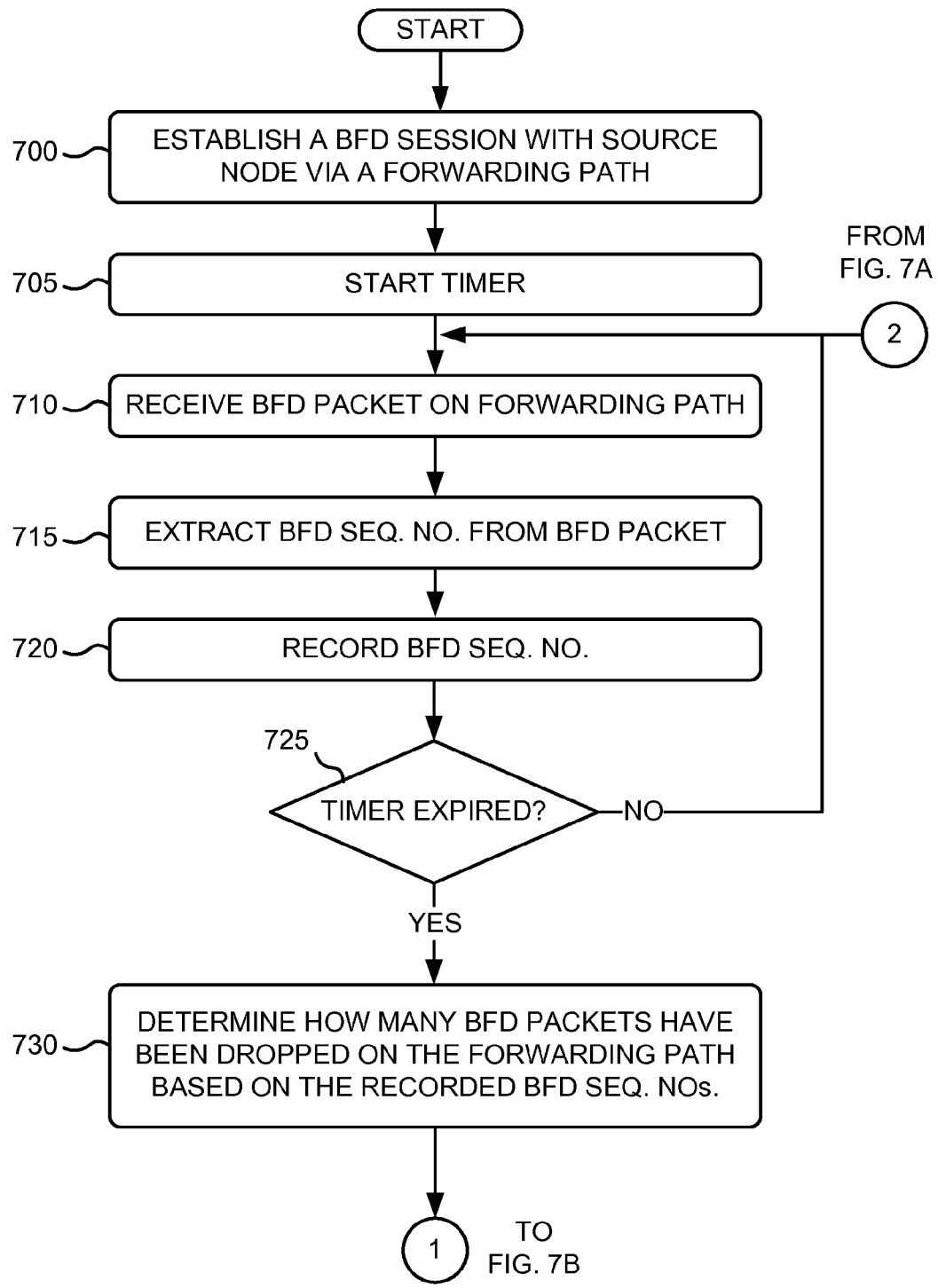
FIGS. 7A and 7B are flow diagrams illustrating an exemplary process for receiving Bidirectional Forwarding Detection packets via a forwarding path, extracting sequence numbers from the packets, and determining a traffic dropping ratio associated with the forwarding path.
Figure 7B:
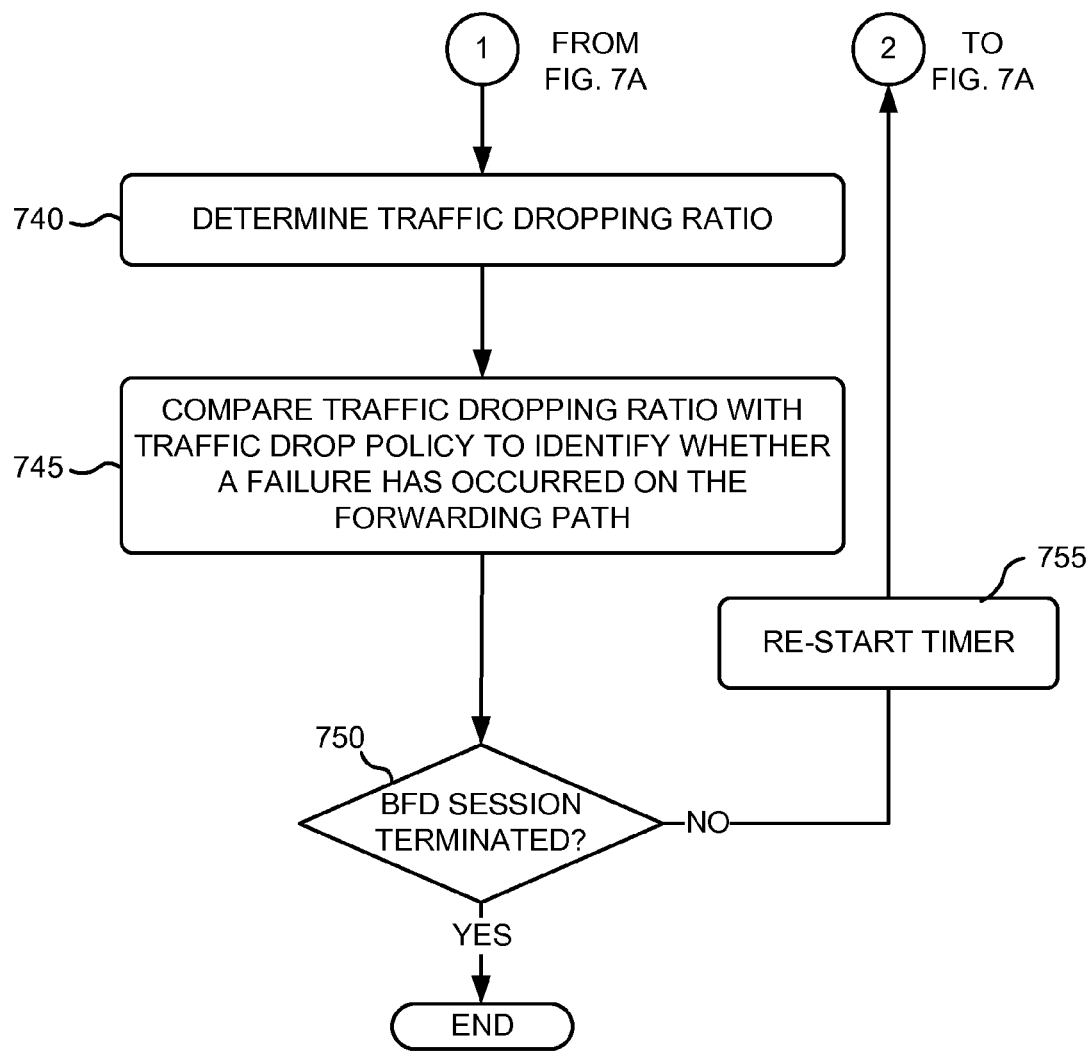

FIGS. 7A and 7B are flow diagrams that illustrate an exemplary process for receiving BFD packets via a forwarding path, and using BFD session sequence numbers contained in the BFD packets to determine a traffic dropping ratio associated with BFD packets that have been dropped during the BFD session. The exemplary process may be performed by a network node 110 (e.g., network node 110-2 in FIG. 1) that is a destination of BFD packets sent from a source node. The exemplary process of FIG. 6 may be described below with reference to the specific example depicted in FIG. 8.

The exemplary process may include establishing a BFD session with a source node via a forwarding path (block 700). Referring to FIG. 8, network node 110-2 may establish a BFD session with network node 110-1 using, for example, a three-way handshake (not shown). A timer may be started (block 705). Module 400 may implement a timer that may determine an interval over which a sequence of packets may be analyzed. Upon the expiration of the timer, the sequence of packets received during that interval may be analyzed.

A BFD packet may be received on the forwarding path (block 710). As shown in FIG. 8, a BFD packet of the BFD packets 120 may be received by network node 110-2 on forwarding path 130 from network node 110-1. A BFD session sequence number may be extracted from the received BFD packet (block 715). For example, BFD packet sequence counting module 400 of network node 110-2 may extract BFD sequence number 520 from BFD packet 500. The extracted BFD session sequence number may be recorded (block 720). For example, BFD packet sequence counting module 400 of network node 110-2 may record the extracted BFD sequence number (e.g., in memory).

It may be determined if the timer has expired (block 725). If the timer has not expired (block 725—NO), then the exemplary process may return to block 710 with the receipt of a next BFD packet in the BFD session on the forwarding path. Blocks 710 through 720 may be repeated until expiration of the timer.

If the timer has expired (block 725—YES), then it may be determined how many BFD packets in the BFD session have been dropped on the forwarding path based on the recorded BFD sequence numbers (block 730). BFD packet sequence counting module 400 may, based on the recorded packet sequence numbers for the session, count how many sequence numbers are missing (i.e., the corresponding packets have been dropped) from the recorded sequence numbers to determine packet sequence count 430. Module 400 may pass packet sequence count 430 to traffic dropping ratio determination module 410. FIG. 8 depicts an example in which traffic dropping measuring unit 140 determines that 10 packets 800 have been dropped on forwarding path 130 during a time interval.

A traffic dropping ratio may be determined (block 740, FIG. 7B) based on the determined number of BFD packets dropped on the forwarding path. Module 410 may determine the traffic dropping ratio by dividing the number of packets that have been dropped on the forwarding path during the timer interval by the total number of packets in the sequence of BFD packets. Module 410 may pass traffic dropping ratio 150 to traffic dropping policy analysis module 420. In the example of FIG. 8, traffic dropping ratio measuring unit 140 may determine that 500 total packets have been sent in the BFD packet sequence during the time interval and, by dividing the 10 dropped packets by the 500 total packets, unit 140 may determine that the traffic dropping ratio 820 is 0.02.

The traffic dropping ratio may be compared with a traffic drop policy to identify whether a failure has occurred on the forwarding path (block 745). For example, traffic dropping policy analysis module 420 may receive traffic dropping ratio 150 from module 410, and may compare ratio 150 with a traffic drop policy to identify if a failure on the forwarding path has occurred. If the comparison of ratio 150 with the traffic drop policy indicates a failure, then module 420 may issue a forwarding path failure identification 160. In the example of FIG. 8, unit 140 may determine that a forwarding path failure 830 exists on forwarding path 130 between network node 110-1 and 110-2.

It may be determined if the BFD session has terminated (block 750). Either of the two network nodes participating in the BFD session (e.g., network node 110-1 or 110-2) may terminate the BFD session. If the BFD session has not been terminated (block 750—NO), then the timer may be re-started (block 755) and the exemplary process may return to block 710 with the receipt of a next BFD packet in the sequence of BFD packets. If the BFD session has been terminated (block 750—YES), then the exemplary process may end.

Exemplary embodiments described herein implement a BFD network protocol that includes the insertion of BFD sequence numbers in each BFD packet for the detection of traffic dropping, including random traffic dropping, on a forwarding path between two network nodes. Using the BFD network protocol described herein, a traffic dropping ratio may be determined using the sequence numbers of BFD packets received at a network node involved in a BFD session. The traffic dropping ratio may be compared with a traffic drop policy to determine if a forwarding path failure has occurred. BFD packets, with BFD sequence numbers, may be implemented globally in a network for network routing (and re-routing) decision making, for Service Level Agreement (SLA) enforcement and verification, and for network maintenance and troubleshooting; or on a hop-by-hop basis for operational troubleshooting purposes.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6, 7A and 7B, the order of the blocks may be modified in other embodiments. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   establishing a Bidirectional Forwarding Detection (BFD) session across a link comprising a single hop between a first packet forwarding engine (PFE) in a first network device and a second PFE in a second network device, wherein the first PFE in the first network device and the second PFE in the second network device both implement a BFD network protocol;
   inserting, at the first PFE in the first network device using the BFD network protocol, BFD sequence numbers into a sequence of a plurality of BFD packets of the BFD session, respectively;
   sending, from the first PFE in the first network device via the link comprising the single hop, the sequence of the plurality of BFD packets, into which the BFD sequence numbers are inserted, respectively, to the second PFE in the second network device;
   receiving, at the second PFE in the second network device via the link, BFD packets of the sequence of the plurality of BFD packets;
   extracting, at the second PFE in the second network device using the BFD network protocol, BFD sequence numbers in the received BFD packets, wherein each of the BFD sequence numbers is extracted from a corresponding BFD packet before a next BFD packet is received;
   recording, at the second PFE in the second network device, each of the extracted BFD sequence numbers before the next BFD packet is received;
   identifying missing sequence numbers based on the recorded BFD sequence numbers;
   determining, at the second PFE in the second network device, a first number of BFD packets that have been dropped on the link, among the plurality of BFD packets by counting the identified missing sequence numbers;
   determining a traffic dropping ratio for the link based on the first number of the BFD packets that have been dropped on the link; and
   using the traffic dropping ratio for traffic reporting and/or traffic analysis.

2. The method of claim 1, wherein the link comprises a physical link or a logical link.

3. The method of claim 2, wherein the physical link comprises an optical fiber, or an optical wavelength on an optical fiber.

4. The method of claim 2, wherein the logical link comprises a Multiprotocol Label Switching (MPLS) Label Switched Path (LSP) or a Virtual Circuit (VC).

5. The method of claim 1, wherein the first number of the BFD packets is a number of BFD packets that have been dropped on the link during a period of time.

6. The method of claim 5, further comprising:
determining a second number of BFD packets, of the plurality of BFD packets, that should have been received in the period of time based on the recorded BFD sequence numbers,
wherein determining the traffic dropping ratio further comprises:
dividing the first number of BFD packets by the second number of BFD packets to derive the traffic dropping ratio on the link comprising the single hop.

7. The method of claim 1, further comprising:
sending, from the second PFE in the second network device, the determined traffic dropping ratio of the link comprising the single hop across a network to a network management system.

8. The method of claim 1, further comprising:
using the traffic dropping ratio for routing decision making.

9. The method of claim 1, further comprising:
using the traffic dropping ratio for Service Level Agreement (SLA) enforcement and/or verification.

10. A first network device, comprising:
a first packet forwarding engine (PFE) connected to a second PFE in a second network device via a first link comprising a single hop, wherein the first PFE is configured to:
establish a first Bidirectional Forwarding Detection (BFD) session, using a BFD protocol, across the first link comprising the single hop between the first PFE and the second PFE in the second network device,
receive, from the second PFE via the first link, BFD packets of a sequence of a first plurality of BFD packets of the first BFD session, wherein the received BFD packets include respective BFD sequence numbers inserted by the second PFE,
extract, at the second PFE in the second network device using the BFD network protocol, BFD sequence numbers included in the received BFD packets, wherein each of the BFD sequence numbers is extracted from a corresponding BFD packet before a next BFD packet is received,
record, at the second PFE in the second network device, each of the extracted BFD sequence numbers before the next BFD packet is received,
identify a first group of missing sequence numbers based on the recorded BFD sequence numbers included in the received BFD,
determine a first number of BFD packets that have been dropped on the first link by counting the identified first group of missing sequence numbers,
determine a first traffic dropping ratio for the first link based on the first number of the BFD packets that have been dropped on the first link, and
report the first traffic dropping ratio for the first link to a network management system.

11. The first network device of claim 10, further comprising:
a third PFE connected to a fourth PFE in a third network device via a second link comprising a single hop, wherein the third PFE is configured to:
establish a second Bidirectional Forwarding Detection (BFD) session, using the BFD protocol, across the second link comprising the single hop between the third PFE and the fourth PFE in the third network device,
insert, using the BFD network protocol, second BFD sequence numbers into a sequence of a second plurality of BFD packets of the second BFD session, respectively, and
send, to the fourth PFE in the third network device via the second link, the sequence of the second plurality of BFD packets for a traffic dropping ratio determination for the second link.

12. The first network device of claim 10, further comprising:
a third PFE connected to a fourth PFE of a third network device via a second link comprising a single hop, wherein the third PFE is configured to:
establish a second Bidirectional Forwarding Detection (BFD) session, using the BFD protocol, across the second link comprising the single hop between the third PFE and the fourth PFE in the third network device,
receive, from the fourth PFE via the second link, second BFD packets of a sequence of a second plurality of BFD packets of the second BFD session, wherein the received second BFD packets include BFD sequence numbers inserted by the fourth PFE,
extract the second BFD sequence numbers included in the second BFD packets, wherein each of the second BFD sequence numbers is extracted from each of the second plurality of BFD packets as each of the second BFD packets is received,
record, at the second PFE in the second network device, each of the BFD sequence numbers as each of the second BFD sequence numbers is extracted
identify a second group of missing sequence numbers based on the second BFD sequence numbers included in the received second BFD packets,
determine a first number of the second BFD packets of the second plurality of packets that have been dropped on the second link by counting the identified second group of missing sequence numbers,
determine a second traffic dropping ratio for the second link based on the first number of the second BFD packets of the sequence of the second plurality of BFD packets that have been dropped on the second link, and
report the second traffic dropping ratio for the second link to the network management system.

13. The first network device of claim 10, wherein the first network device comprises a router, a switch, a bridge, a hub, a repeater, or a gateway and wherein the second network device comprises a router, a switch, a bridge, a hub, a repeater, or a gateway.

14. The first network device of claim 10, wherein the first link comprises a physical link or a logical link, wherein the physical link comprises an optical fiber or an optical wavelength on an optical fiber, and wherein the logical link comprises a Multiprotocol Label Switching (MPLS) Label Switched Path (LSP) or a Virtual Circuit (VC).

15. A method, comprising:
establishing a first Bidirectional Forwarding Detection (BFD) session, using a BFD protocol, between a first packet forwarding engine (PFE) in a first network device and a second PFE in a second network device via a first link comprising a single hop connecting the first PFE to the second PFE;
receiving, from the second PFE via the first link comprising the single hop, BFD packets of a sequence of a first plurality of BFD packets, wherein the received BFD packets include BFD sequence numbers inserted by the second PFE, respectively;
extracting, at the second PFE in the second network device using the BFD network protocol, BFD sequence numbers in the received BFD packets, wherein each of the BFD sequence numbers is extracted from a corresponding BFD packet before a next BFD packet among the first plurality of BFD packets is received;
recording, at the second PFE in the second network device, each of the extracted BFD sequence numbers before the next BFD packet is received;
identifying a first group of missing sequence numbers based on the recorded BFD sequence numbers included in the received BFD packets;
determining a first number of the BFD packets that have been dropped on the first link, among the first plurality of BFD packets by counting the identified first group of missing sequence numbers;
determining a first traffic dropping ratio for the first link based on the first number of the BFD packets of the sequence of the first plurality of BFD packets that have been dropped on the first link; and
reporting the first traffic dropping ratio for the first link to a network management system.

16. The method of claim 15, further comprising:
establishing a second Bidirectional Forwarding Detection (BFD) session, using a BFD protocol, between a third PFE in the first network device and a fourth PFE in the second network device via a second link comprising a single hop connecting the third PFE to the fourth PFE;
receiving, from the fourth PFE via the second link, second BFD packets of a sequence of a second plurality of BFD packets of the second BFD session, wherein the received second BFD packets include BFD sequence numbers inserted by the fourth PFE, respectively;
identifying a second group of missing sequence numbers based on the BFD sequence numbers included in the received second BFD packets;
determining a first number of the second BFD packets of the second plurality of BFD packets that have been dropped on the second link by counting the identified second group of missing sequence numbers;
determining a second traffic dropping ratio for the second link based on the first number of the second BFD packets of the sequence of the second plurality of BFD packets that have been dropped on the second link; and
reporting the second traffic dropping ratio for the second link to the network management system.

17. The method of claim 15, further comprising:
establishing a second Bidirectional Forwarding Detection (BFD) session, using a BFD protocol, between a third PFE in the first network device and a fourth PFE in the second network device via a second link comprising a single hop connecting the third PFE to the fourth PFE;
inserting, using the BFD network protocol, BFD sequence numbers into a sequence of a plurality of second BFD packets of the second BFD session, respectively; and
sending, to the fourth PFE at the third network device via the second link, the sequence of the plurality of second BFD packets for a traffic dropping ratio determination for the second link.

18. A first network device, comprising:
a first packet forwarding engine (PFE), connected to a second PFE of a second network device via a first link comprising a single hop, configured to:
establish a first Bidirectional Forwarding Detection (BFD) session, using a BFD protocol, across the first link comprising the single hop between the first PFE and the second PFE in the second network device,
identify a first group of missing sequence numbers, based on BFD sequence numbers included in first BFD packets of the first plurality of BFD packets, wherein the first BFD packets are sent from the second PFE and received at the first PFE, and each of the BFD sequence numbers included in the first BFD packets is extracted from a corresponding first BFD packet before a next BDFD packet is received,
determine a first quantity of the identified first group of missing sequence numbers by counting the identified first group of missing sequence numbers, and
report a first traffic dropping ratio for the first link to a network management system, wherein the first traffic dropping ratio is determined based on the first quantity of the identified first group of missing sequence numbers; and
a third PFE, connected to a fourth PFE of a third network device via a second link comprising a single hop, configured to:
establish a second Bidirectional Forwarding Detection (BFD) session, using the BFD protocol, across the second link comprising the single hop between the third PFE and the fourth PFE in the third network device,
identify a second group of missing sequence numbers, based on the BFD sequence numbers included in second BFD packets of the second plurality of BFD packets, wherein the second BFD packets are sent from the fourth PFE and received at the third PFE, and each of the BFD sequence numbers included in the second BFD packets is extracted from each of the second BFD packets as each of the second BFD packet is received,
determine a second quantity of the identified second group of missing sequence numbers by counting the identified second group of missing sequence numbers, and
report a second traffic dropping ratio for the second link to the network management system, wherein the second traffic dropping ratio is determined based on the second quantity of the identified second group of missing sequence numbers.

19. The first network device of claim 18, wherein the first PFE is further configured to:
determine a first number of the first BFD packets of the sequence of the first plurality of BFD packets that have been dropped on the first link based on the first quantity of the first group of missing sequence numbers, and
determine the first traffic dropping ratio for the first link based on the first number of the first BFD packets of the sequence of the first plurality of BFD packets that have been dropped on the first link.

20. The first network device of claim 18, wherein the third PFE is further configured to:
- determine a first number of the second BFD packets of the sequence of the second plurality of BFD packets that have been dropped on the second link based on the second quantity of the second group of missing sequence numbers, and
- determine the second traffic dropping ratio for the second link based on the first number of the second BFD packets of the sequence of the second plurality of BFD packets that have been dropped on the second link.

* * * * *